Sept. 29, 1964   J. WALK   3,150,529
INFINITELY VARIABLE SPEED BELT DRIVES
Filed Jan. 31, 1962   2 Sheets-Sheet 1

Inventor
JOSEF WALK

Sept. 29, 1964   J. WALK   3,150,529
INFINITELY VARIABLE SPEED BELT DRIVES
Filed Jan. 31, 1962   2 Sheets-Sheet 2

Inventor

United States Patent Office 3,150,529
Patented Sept. 29, 1964

3,150,529
INFINITELY VARIABLE SPEED BELT DRIVES
Josef Walk, 35 Eifelstrasse, Cologne (Rhine), Germany
Filed Jan. 31, 1962, Ser. No. 170,212
5 Claims. (Cl. 74—230.19)

This invention relates to improvements in infinitely variable speed belt drives.

Infinitely variable belt drives employing V belts have been proposed in which the diameter of one or both belt pulleys is/are varied by adjustment of the flanges of the pulley or pulleys to bring the belt nearer to or further from the axis or axes of the pulleys.

Belt gears of the aforesaid type have been constructed in which a belt is driven by an electric motor and passed over a pulley, one flange of which is pressed by a spring towards the second flange, lateral movement of the motor applying tension to the belt to cause the belt to separate the pulley flanges as the motor is moved away from the axis of the pulley and thus reducing the gear ratio whilst movement of the motor towards the axis of the pulley causes the belt to ride up the flanges under the action of the spring and to thereby increase the gear ratio.

According to the invention a variable speed belt drive comprises a radially slotted flange loosely mounted on a shaft, a plurality of threaded rods journalled longitudinally one in each slot, a slotted jaw adapted to receive a V belt, for sliding in each slot, through which jaw one of the threaded rods passes, a bevel pinion mounted on each rod, a bevel gear engaging the pinions, gearing for rotating the bevel gear relatively to the flange to vary the radial positions of the jaws, a V belt extending over the jaws and an electric motor by which the belt is driven, means being provided for allowing lateral movement of the motor.

The invention will be described with reference to the accompanying drawings.

Figure 1:
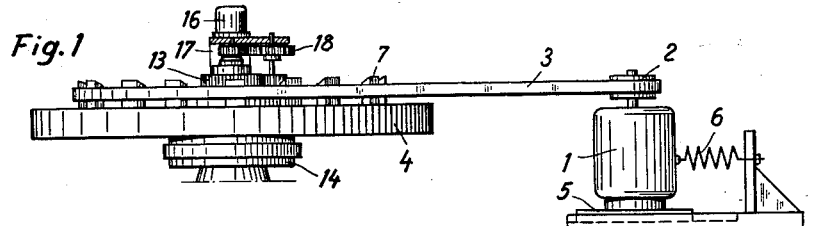
FIG. 1 is a side elevation of the drive.
Figure 2:
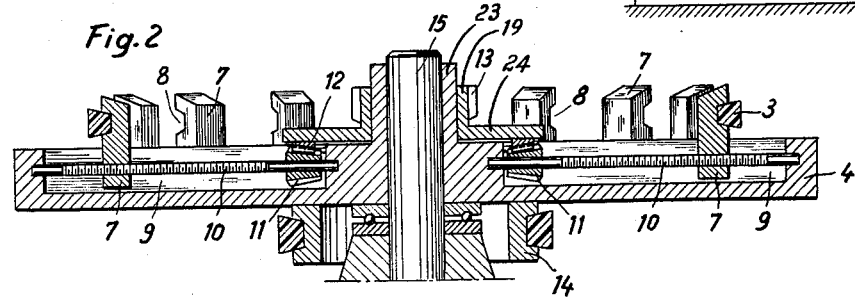
FIG. 2 is a vertical section to a large scale through the variable speed flange on line II—II, FIG. 3.
Figure 3:
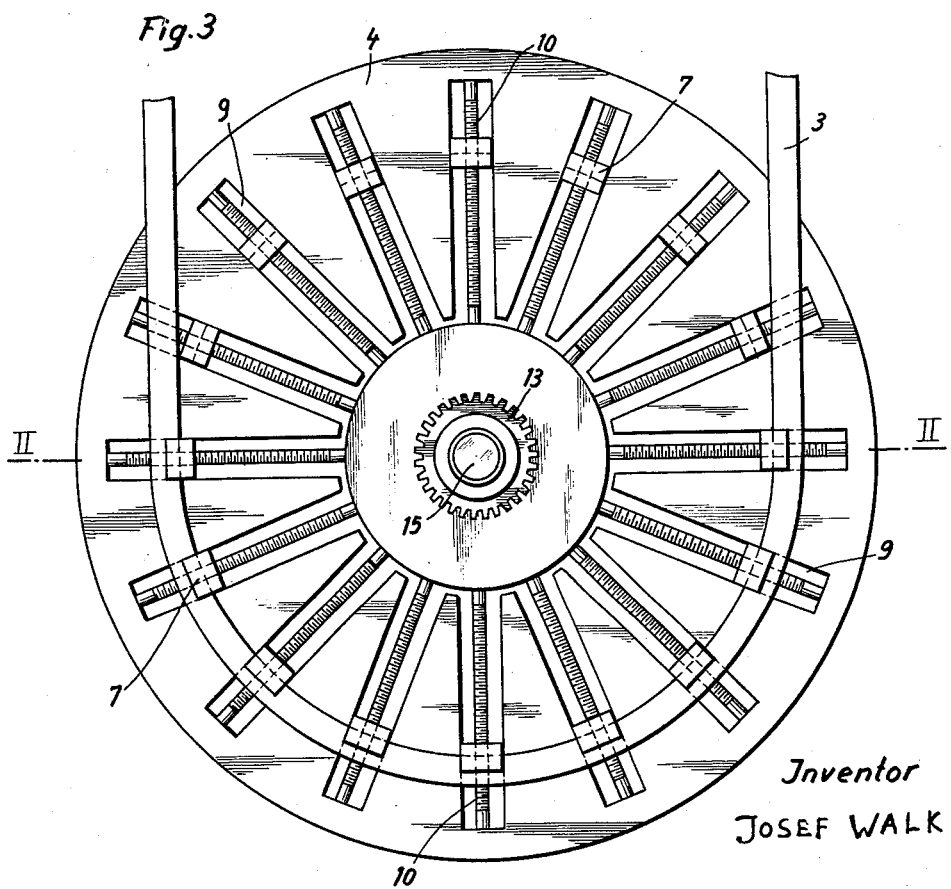
FIG. 3 is a plan of FIG. 2.

The drive comprises a belt pulley 2 mounted on the spindle of an electric motor 1, a V belt passing over the pulley 2 and around a second variable diameter pulley 4.

The tension on the belt is maintained constant during variation of the diameter of the pulley 4 by mounting the motor in a slide 5 against the action of a spring 6.

The variable diameter pulley is constructed as a flange 4 or disc mounted on a spindle 15 and formed with a plurality of slots 9 radiating from a central hub. Each slot 9 houses a threaded rod 10 capable of rotation in the hub and in a peripheral rim of the slot. A jaw 7 is mounted on each rod 10 and is formed with a recess to receive the belt 3. Thus as the positions of the jaws 7 in the flange 4 are varied to provide a variable speed drive the position of the motor in the slide 5 is automatically adjusted against the spring 6 to maintain a constant tension on the belt 3.

A bevel pinion 11 is fixedly mounted on each rod 10, the pinions 11 engaging a bevel gear wheel 12 loosely mounted on an extension 23 of the hub and concentric with the flange. A boss 19 on the bevel gear wheel 24 is provided with teeth 13 to provide a pinion engaging a pinion 18' of a gear train 18 supported by a plate 17 and driven by an electric motor 16. The motor 16 is controlled for rotation in either direction to rotate the rods 10 relatively to the flange to move the jaws towards or away from the hub in slots 9. Sixteen slots 9 and sixteen rods 10 and jaws 7 are shown in the drawings.

Figure 1A:
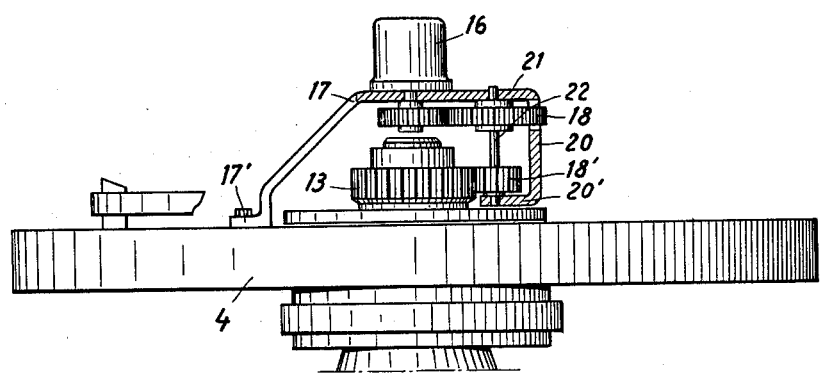
FIG. 1a is a side elevation view of the motor support, partly in section.

The support bracket 17 of FIGURE 1a which supports the motor 16 and the rotatable shaft 22 is mounted on top of the pulley and has generally the shape of a tripod, the legs 17' of the tripod being secured to the upper face of the pulley between the radial slots 9. The motor 16 is mounted on the support bracket coaxially with the pulley and the motor shaft extends below the upper surface 21 of the bracket toward the pulley. This motor shaft carries a gear wheel 19 which is coupled to the gear wheel 18 mounted on the rotatable shaft 22. This shaft 22 is also supported in the support bracket 17 by means of a depending wall portion 20 having a bottom flange 20' extending parallel to the top surface 21. The shaft 22 is mounted between the top surface and the bottom flange and extends axially parallel to the motor shaft and the pulley shaft. On shaft 22 an additional gear wheel 18' is mounted adjacent the bottom flange 20' and is coupled to the pinion 13 of gear wheel 24.

A constant diameter V belt pulley 14 is mounted on the side of the flange opposite the toothed pinion 13 from which a drive is taken from the variable speed flange.

The shaft 15 may be stationary and mounted in a base with the flange 4 rotating on a ball or roller race supported on the base.

What I claim is:

1. Variable speed belt drive comprising a belt pulley having annularly disposed belt engaging means consisting of a plurality of peripherally spaced jaw members, stationary shaft means for loosely supporting said belt pulley, radial grooves in one side of said belt pulley extending between the hub and the periphery thereof, a radially disposed rod journalled for rotation in each groove and threaded intermediate its ends, said jaw members having a threaded bore for receiving said threaded rods, a bevel pinion fixed to each threaded rod at its inner end, said pulley having an axial hub extension on said one side, a bevel gear mounted loosely on said hub extension and engaging said bevel pinions, said bevel gear having an annular hub portion surrounding said hub extension, said hub portion having a toothed periphery to form a hub pinion, a first electric motor, support means mounted on said pulley for supporting said first electric motor coaxially with said pulley, a gear train connected to said first electric motor and supported by said support means, said gear train including a pinion coupled with said hub pinion, and a second electric motor for driving a belt engaging said jaw members to rotate said pulley.

2. Variable speed belt drive comprising a belt pulley having a plurality of annularly disposed peripherally spaced belt engaging jaw members, stationary shaft means for rotatably supporting said pulley, radial grooves in one side of said pulley extending between the hub and the periphery thereof, a radially disposed rod journalled for rotation in each groove and threaded intermediate its ends, said jaw members having a threaded bore for receiving said threaded rods, a bevel pinion fixed to each threaded rod at its inner end, said pulley having an axial hub extension on said one side, a bevel gear for engaging said bevel pinions and having an annular hub portion loosely surrounding said hub extension, said hub portion having a toothed periphery to form a hub pinion, a first electric motor, a support bracket mounted on said pulley at said one side and supporting said first electric motor, said motor having a downwardly extending shaft, a first gear wheel mounted on said motor shaft, a rotary shaft journalled in said support bracket and extending axially parallel to said motor shaft, a second gear wheel fixed to said rotary shaft and coupled to said first gear wheel, a third gear wheel fixed to said rotary shaft and coupled to said hub pinion, and a second electric motor for driving the belt engaging said jaw members to rotate said pulley.

3. A variable speed belt drive according to claim 2 wherein said support member consists of a tripod shaped frame having a top surface for supporting said rotary shaft and a depending wall portion intermediate two legs of said tripod frame, said depending wall portion having a bottom flange substantially parallel to said top surface, said rotary shaft being supported between said top surface and said bottom flange.

4. A variable speed belt drive according to claim 2 wherein said second electric motor is mounted for sliding movement relative to said pulley, a spring member exerting a constant bias on said second electric motor to tension said belt.

5. A variable speed belt drive according to claim 2 wherein said pulley is mounted on a stationary shaft.

References Cited in the file of this patent

UNITED STATES PATENTS

| | | |
|---|---|---|
| 702,630 | Christensen | June 17, 1902 |
| 1,126,195 | Granz | Jan. 26, 1915 |
| 2,196,402 | Snyder | Apr. 9, 1940 |
| 2,211,986 | Pfleger | Aug. 20, 1940 |
| 2,638,005 | King et al. | May 12, 1953 |

FOREIGN PATENTS

| | | |
|---|---|---|
| 182,329 | Germany | Mar. 25, 1907 |
| 363,411 | Germany | Apr. 29, 1921 |